United States Patent
Atmur et al.

(10) Patent No.: US 9,281,736 B2
(45) Date of Patent: Mar. 8, 2016

(54) VIRTUAL ELLIPSE MOTOR

(71) Applicant: The Boeing Company, Chicago, IL (US)

(72) Inventors: Robert J. Atmur, Whittier, CA (US); William P. Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 514 days.

(21) Appl. No.: 13/849,501

(22) Filed: Mar. 23, 2013

(65) Prior Publication Data

US 2014/0285072 A1 Sep. 25, 2014

(51) Int. Cl.
*H02K 41/06* (2006.01)

(52) U.S. Cl.
CPC .................... *H02K 41/065* (2013.01)

(58) Field of Classification Search
CPC ...... H02K 41/065; H02K 41/06; H02K 7/116
See application file for complete search history.

(56) References Cited

U.S. PATENT DOCUMENTS

| | | | | |
|---|---|---|---|---|
| RE22,549 E | * | 9/1944 | Plensler ............... | H02K 41/065 310/82 |
| 2,953,944 A | * | 9/1960 | Sundt ................... | F16H 3/70 188/181 R |
| 3,585,426 A | * | 6/1971 | Newell ................. | H02K 41/065 310/82 |
| RE29,411 E | * | 9/1977 | Newell ................. | H02K 41/065 310/49.47 |
| 5,269,202 A | | 12/1993 | Kiyosawa | |
| 5,804,898 A | * | 9/1998 | Kawai ................... | H02K 41/065 310/268 |
| 6,817,267 B2 | | 11/2004 | Kobayashi et al. | |
| 7,034,425 B2 | | 4/2006 | Detela | |
| 7,128,469 B2 | | 10/2006 | Kobayashi | |
| 7,462,967 B2 | | 12/2008 | Maruyama | |
| 7,752,943 B2 | | 7/2010 | Maruyama | |
| 8,281,688 B2 | | 10/2012 | Kobayashi | |
| 8,302,507 B2 | | 11/2012 | Kanai | |

OTHER PUBLICATIONS

Tuttle, Timothy D., "Understanding and Modeling the Behavior of a Harmonic Drive Gear Transmission", MIT AI Technical Report AITR-1365, May 1, 1992.

* cited by examiner

*Primary Examiner* — Dang Le
(74) *Attorney, Agent, or Firm* — McDonnell Boehnen Hulbert & Berghoff LLP (57) ABSTRACT

A virtual ellipse electric motor and methods are presented. A fulcrum bears a nutating dynamic load, and a wobble plate is rotationally coupled to the fulcrum and nutates around the fulcrum. The wobble plate includes an inner pericyclic gear and an outer pericyclic gear, and a stationary gear meshes with the outer pericyclic gear and provides leverage to the wobble plate. The rotational output plate meshes with the inner pericyclic gear and rotates in response to rotation of the wobble plate. The stator includes an electromagnet and electromagnetically attracts a first side of the wobble plate such that a second side of the wobble plate is leveraged against the stationary gear and the rotational output plate.

20 Claims, 9 Drawing Sheets

VIRTUAL ELLIPSE MOTOR

FIELD

Embodiments of the present disclosure relate generally to electric motors. More particularly, embodiments of the present disclosure relate to switched reluctance electric motors.

BACKGROUND

An electric motor creates a mechanical force from electromagnetic current. An alternating current (AC) electric motor (AC motor) generally comprises a stationary stator and a rotor. The stationary stator generally comprises electrical wire coils supplied with alternating current producing a rotating magnetic field. The rotor is attached to an output shaft that is given a torque by the rotating magnetic field.

A type of electric motor is a reluctance motor that generates torque through magnetic reluctance. A reluctance motor induces non-permanent magnetic poles on a ferromagnetic rotor. Existing reluctance motors generally have a high torque ripple, where a difference between maximum and minimum torque during one revolution is high when operated at low speed.

There is a need for electro-mechanical motors that are small, low weight, high torque, and can operate at low speed. There is a further need for such electro-mechanical motors to provide actuation that can be low vibration, jam free and/or tolerant, and provide high holding load capability.

SUMMARY

A virtual ellipse electric motor and methods are presented. A fulcrum bears a nutating dynamic load, and a wobble plate is rotationally coupled to the fulcrum and nutates around the fulcrum. The wobble plate comprises an inner pericyclic gear and an outer pericyclic gear. A stationary gear meshes with the outer pericyclic gear and provides leverage to the wobble plate. The rotational output plate meshes with the inner pericyclic gear and rotates in response to nutation of the wobble plate. A stator comprises an electromagnet and electromagnetically attracts a first side of the wobble plate such that a second side of the wobble plate is leveraged against the stationary gear and the rotational output plate.

In this manner, embodiments of the disclosure provide a high torque low speed electro-mechanical motor that performs as well or better than hydraulic actuation with power and energy density equal to or greater than hydraulic actuation. Existing switched reluctance motors do not provide guaranteed starting, controlled starting direction and reversing capability with less than 6 stator poles and 4 rotor poles. Embodiments of the disclosure can achieves guaranteed starting, controlled starting direction and reversing capability with 6 stator poles and one virtual rotor pole, and do not require and may be configured without rotor poles, but nonetheless can provide starting, holding, reversing as well as or better than existing motors. Embodiments of the disclosure provide an electric motor that need not use expensive rare earth metals, and provides low vibration, and substantially jam free and/or jam tolerant high holding load capability. The electric motor can de-couple from an output shaft when in a non-optimal condition or de-powered mechanically, and is electrically robust.

In an embodiment, a virtual ellipse electric motor comprises a fulcrum, a wobble plate, a stationary gear, a rotational output plate, and a stator. The fulcrum bears a rotating radial dynamic load. The wobble plate is rotationally coupled to the fulcrum and nutates around the fulcrum, and comprises an inner pericyclic gear and an outer pericyclic gear. The stationary gear meshes with the outer pericyclic gear and provides leverage to the wobble plate. The rotational output plate meshes with the inner pericyclic gear and rotates in response to nutation of the wobble plate. The stator comprises an electromagnet and electromagnetically attracts a first side of the wobble plate such that a second side of the wobble plate is leveraged against the stationary gear and the rotational output plate.

In another embodiment, a method for operating a virtual ellipse electric motor nutates a wobble plate rotationally coupled to a fulcrum around the fulcrum, the wobble plate comprising an inner pericyclic gear and an outer pericyclic gear. The method further electromagnetically attracts a first side of the wobble plate to a stator comprising an electromagnet. The method further leverages the wobble plate with the fulcrum to press a second side of the wobble plate against the stationary gear and a rotational output plate. The method further meshes a stationary gear with the outer pericyclic gear, and leverages the outer pericyclic gear to the stationary gear. The method further drives the rotational output plate with the inner pericyclic gear, and rotates the rotational output plate in response to nutation of the wobble plate.

In a further embodiment, a method for configuring a virtual ellipse electric motor configures a fulcrum to bear a rotating radial dynamic load, and rotationally couples a wobble plate comprising an inner pericyclic gear and an outer pericyclic gear to the fulcrum. The method further configures the wobble plate to nutate around the fulcrum, and meshes a stationary gear with the outer pericyclic gear. The method further configures the stationary gear to provide leverage to the wobble plate, and meshes a rotational output plate with the inner pericyclic gear. The method further configures the rotational output plate to rotate in response to nutation of the wobble plate. The method further configures a stator comprising at least one electromagnet to electromagnetically attract a first side of the wobble plate such that a second side of the wobble plate is leveraged against the stationary gear and the rotational output plate.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to electric motors may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of some non-limiting applications, namely, an aircraft actuator. Embodiments of the disclosure, however, are not limited to such aircraft actuator applications, and the techniques described herein may also be utilized in other applications. For example, embodiments may be applicable to automotive electric motors, industrial electric motors, ship electrical motors, submarine electrical motors, consumer product electrical motors, or other electrical motor applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide a switched reluctance electric motor that nutates a wobble plate comprising dual pericyclic gears. A fulcrum provides a leverage point, where the fulcrum is positioned substantially at a center of the wobble plate. During operation, a side of the wobble plate is electromagnetically pulled to a stator, and another side of the wobble plate is pushed against a stationary plate and a rotating plate. Gearing on the stationary plate drives the wobble plate against the rotating plate which drives the rotating plate in a rotational motion as the wobble plate nutates about the fulcrum. Numerous nutations of the wobble plate may cause one rotation of the rotating plate. For example but without limitation, 200 nutations of the wobble plate may cause one rotation of the rotating plate.

Figure 1:
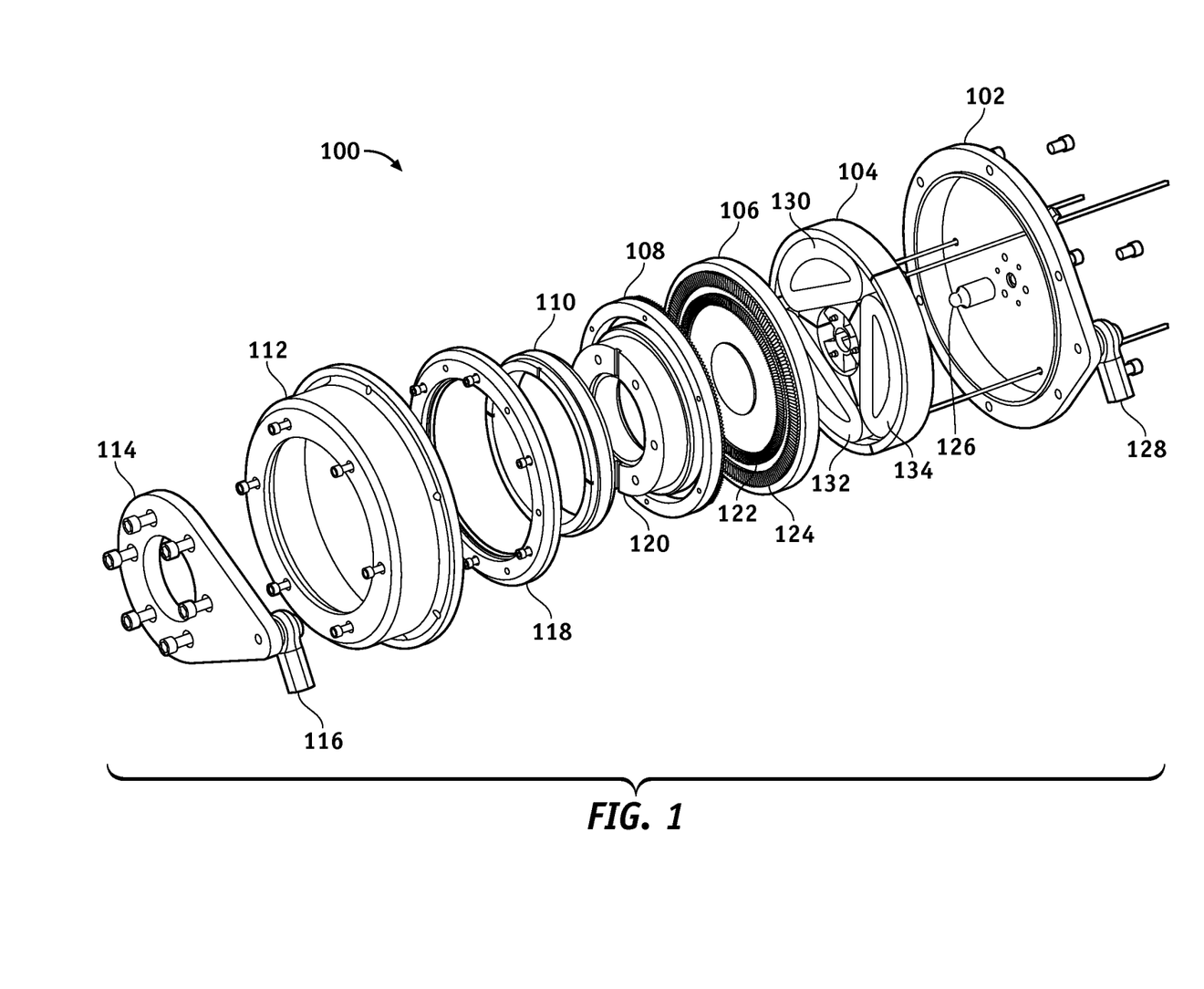
FIG. 1 is an illustration of an exemplary virtual ellipse electric motor according to an embodiment of the disclosure.

FIG. 1 is an illustration of an exemplary virtual ellipse electric motor 100 according to an embodiment of the disclosure. The virtual ellipse electric motor 100 may comprise a wobble plate 106, a fulcrum 126, a stationary gear 108, a rotational output plate 120, and a stator 104. The virtual ellipse electric motor 100 may further comprise a stator housing 102, a bushing 110, a bushing retainer ring 118, an upper housing 112, a rocker arm 114, a first output arm 116, and a second output arm 128.

The wobble plate 106 is rotationally coupled to the fulcrum 126 and is configured to nutate around the fulcrum 126. The wobble plate 106 comprises an inner pericyclic gear 122 and an outer pericyclic gear 124. During operation, a first side 208 (FIG. 2) of the wobble plate 106 is electromagnetically pulled to the stator 104, and a second side 210 (FIG. 2) of the wobble plate 106 is pushed against the stationary gear 108 and the rotational output plate 120. A stationary gear ring 304 (FIG. 3) on the stationary gear 108 is meshed to the outer pericyclic gear 124 and drives the inner pericyclic gear 122 of the wobble plate 106 against an output plate gear ring 302 (FIG. 3) of the rotational output plate 120. Driving the inner pericyclic gear 122 of the wobble plate 106 against the rotational output plate 120 drives the rotational output plate 120 in a rotational motion as the wobble plate 106 nutates about the fulcrum 126. The wobble plate 106 may comprise, for example but without limitation, a slope, a taper, a conical surface, a conical profile (e.g., at an angle 228 (FIG. 2) from a plane of the wobble plate 106), or other configuration.

A ratio of wobble plate 106 nutations may be configured relative to rotations of the rotational output plate 120. For example, numerous nutations of the wobble plate 106 may cause one rotation of the rotational output plate 120. For example but without limitation, about 180 to about 200 nutations of the wobble plate 106 may cause one rotation of the rotational output plate 120.

The fulcrum 126 is rotationally coupled to the wobble plate 106, and is configured to bear a nutating dynamic load received from the wobble plate 106 as the wobble plate 106 is pulled to (or pushed from) the stator 104. The fulcrum 126 provides a leverage point, where the fulcrum 126 is positioned substantially at a wobble plate center 206 (FIG. 2) of the wobble plate 106.

The stationary gear 108 comprises the stationary gear ring 304 (FIG. 3), which is configured to mesh with the outer pericyclic gear 124 and provide leverage to the wobble plate 106.

The rotational output plate 120 comprises the output plate gear ring 302 (FIG. 3), which is configured to mesh with the outer pericyclic gear 124 and provide leverage to the wobble plate 106. In some embodiments, the rotational output plate 120 may be coupled to the rocker arm 114 and thereby to the first output arm 116. Such a configuration may be functional to provide actuation, where the first output arm 116 provides back-and-forth motion in response to rotary motion of the rotational output plate 120. By configuring a large number of nutations of the wobble plate 106 to one rotation of the rotational output plate 120, a substantially fine motion control with substantially high torque may be output from the rotational output plate 120. Substantially fine motion control with substantially high torque may be substantially ideal for many actuation applications, such as but without limitation, for actuation of aircraft control surfaces.

The stator 104 comprises one or more electromagnets such as a first phase electromagnet 130, a second phase electromagnet 132, and a third phase electromagnet 132. Unlike many electric motors, power is delivered to windings in the stator 104 rather than a rotor. This simplifies design as power is not delivered to a moving part. The wobble plate 106 generally comprises no magnets or coils. The electromagnets 130/132/134 pull the first side 208 (FIG. 2) of the wobble plate 106 electromagnetically to the stator 104, and the second side 210 (FIG. 2) of the wobble plate 106 is pushed against the stationary gear 108 and the rotational output plate 120. By rotating a phase of the electromagnets 130/132/134, the electromagnets 130/132/134 can induce the nutations of the wobble plate 106.

The stator housing 102 may be further configured to house the stator 104. In some embodiments, the stator housing 102 may be coupled to the second output arm 128. Such a configuration may be functional to provide actuation, where the second output arm 128 provides back-and-forth motion in response to rotary motion of the stator housing 102. In some embodiments, the virtual ellipse electric motor 100 may comprise both the first output arm 116 and the second output arm 128 to provide dual actuation.

The bushing 110 is coupled to the bushing retainer ring 118 and is configured to provide a bearing for the rotational output plate 120.

The bushing retainer ring 118 is coupled to the bushing 110 and is configured to retain the bushing 110.

The upper housing 112 is configured to couple to the rocker arm 114 to house the virtual ellipse electric motor 100.

Figure 2:
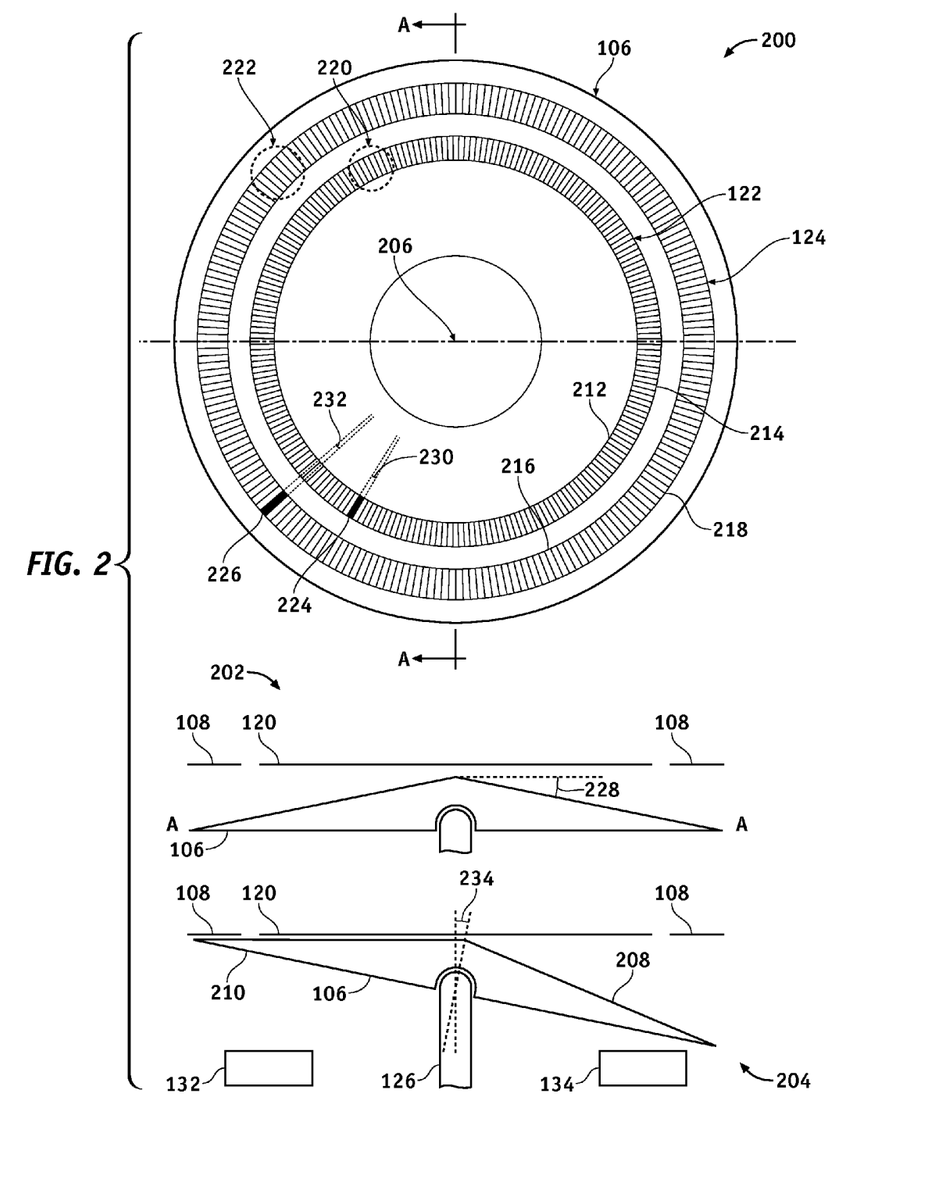
FIG. 2 is an illustration of expanded views of the wobble plate of FIG. 1 according to an embodiment of the disclosure.

FIG. 2 is an illustration of expanded views 200/202/204 of the wobble plate 106 of FIG. 1 according to an embodiment of the disclosure. The expanded view 200 shows a top view of the wobble plate 106. The expanded view 202 shows a side view of the wobble plate 106 taken along an A-A line, and showing the wobble plate 106 in an unpowered disconnected state. The expanded view 204 shows a side view of the wobble plate 106 taken along the A-A line, and showing the wobble plate 106 in a powered state with the wobble plate 106 coupled to the stationary gear 108 and the rotational output plate 120.

Figure 3:
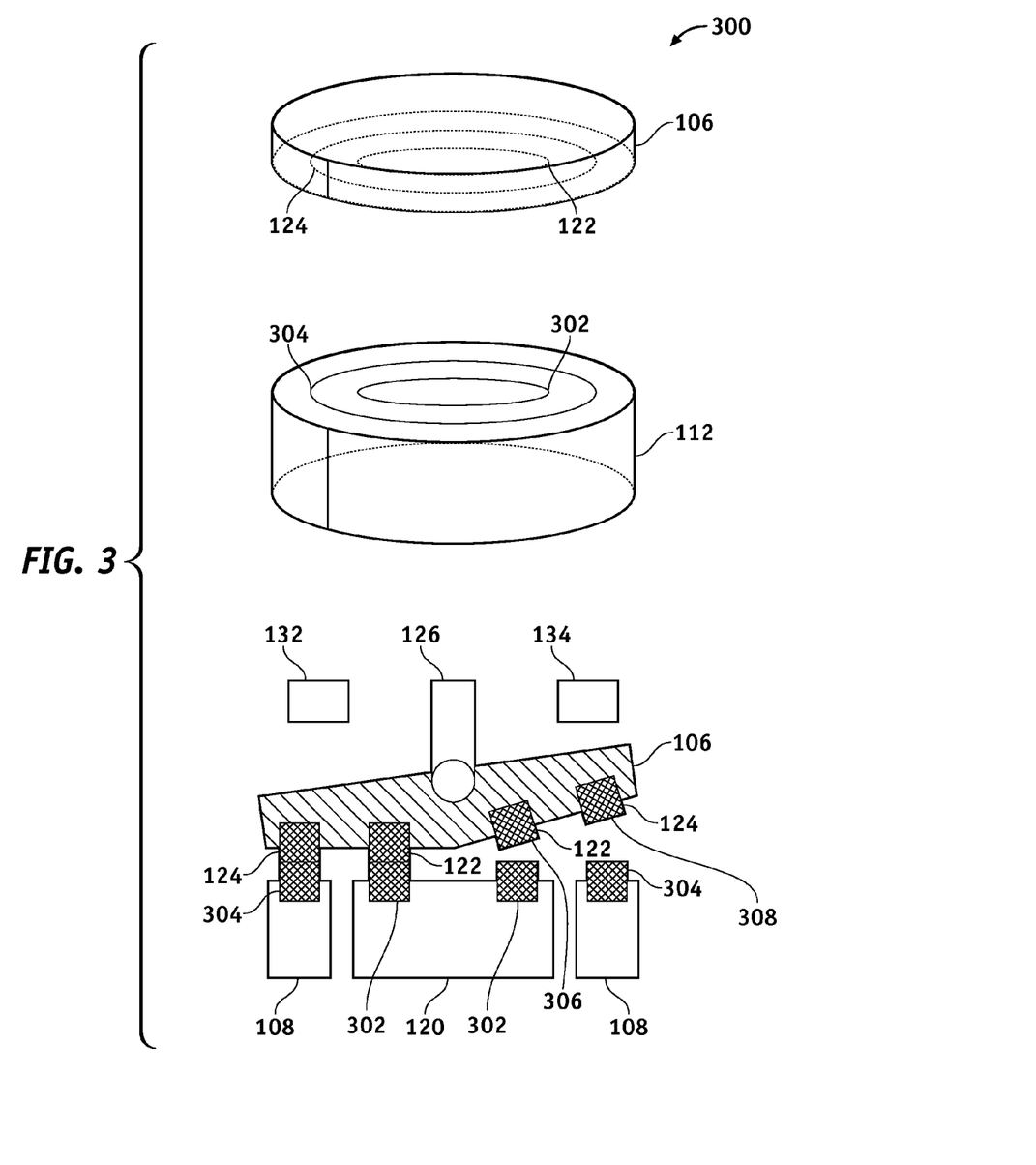
FIG. 3 is an illustration of an interface of a wobble plate to a stationary gear and a rotational output plate according to an embodiment of the disclosure.

FIG. 3 is an illustration of an interface of the wobble plate 106 to the stationary gear 108 and the rotational output plate 120 according to an embodiment of the disclosure. When one of the electromagnets 130/132/134 such as the electromagnet 134 electromagnetically pulls the first side 208 (FIG. 2) of the wobble plate 106 to the stator 104, the second side 210 (FIG. 2) of the wobble plate 106 is pushed against the stationary gear 108 and the rotational output plate 120. The inner pericyclic gear 122 of the wobble plate 106 radially meshes with the output plate gear ring 302 of the stationary gear 108 along a plane of the output plate gear ring 302. The outer pericyclic gear 124 of the wobble plate 106 radially meshes with the stationary gear ring 304 of the rotational output plate 120 along a plane of the stationary gear ring 304.

The wobble plate 106 meshes with the stationary gear 108 and the rotational output plate 120 radially inward along a plane that contains the stationary gear 108 and the rotational output plate 120. The inner pericyclic gear 122 and the outer pericyclic gear 124 sit at fixed radiuses from the fulcrum 126. As the wobble plate 106 tilts (e.g., at an angle 234 of the wobble plate center 206 from an axis of the fulcrum 126), a radial location of the wobble plate center 206 of gear teeth 220 of the inner pericyclic gear 122 and gear teeth 222 of the outer pericyclic gear 124 of the wobble plate 106 moves radially inward. Each gear tooth 220/222 of the inner pericyclic gear 122 and the outer pericyclic gear 124 may comprise a wedge shape 224/226 that is smaller on an inner radius 212/216 than on an outer radius 214/218 of the inner pericyclic gear 122 and the outer pericyclic gear 124. The wedge shape 224/226 of each gear tooth 220/222 of the inner pericyclic gear 122 and the outer pericyclic gear 124 is driven radial inward as the wobble plate 106 moves toward the stationary gear 108 and the rotational output plate 120.

The wedge shape 224/226 may be configured comprising, for example but without limitation, an angle 230/232 in a plane of the wobble plate 106, a surface 306/308 of the wedge shape 224/226 configured at an angle relative to the stationary gear 108 (e.g., when meshed), the surface 306/308 of the wedge shape 224/226 configured at an angle relative to the rotational output plate 120 (e.g., when meshed), the surface 306/308 of the wedge shape 224/226 configured at an angle relative to the wobble plate 106, or other wedge shape configuration.

Radial motion of the wedge shape 224/226 of each gear tooth 220/222 of the inner pericyclic gear 122 and the outer pericyclic gear 124 aligns the stationary gear 108 and the rotational output plate 120 and applies a radial load to the fulcrum 126. Other loads may push the wobble plate 106 away from the stationary gear 108 and the rotational output plate 120 but may be proportional to multiplication of a sine function (sine $\alpha$) of a wedge angle ($\alpha$) of each gear tooth 220/222 of the inner pericyclic gear 122 and the outer pericyclic gear 124 and a sine function (sine $\theta$) of a plate angle ($\theta$) of the wobble plate 106. The wedge angle ($\alpha$) may comprise, for example but without limitation, about 14 degrees or other suitable angle. The plate angle ($\theta$) may comprise, for example but without limitation, about 1.6 degrees or other suitable angle.

In some embodiments, a number of gear teeth of the stationary gear 108 is equal to a number of the gear teeth 222 of the outer pericyclic gear 124, and a number of gear teeth of the rotational output plate 120 is equal to a number of the gear teeth 220 of the inner pericyclic gear 122. With such an equal number of teeth, the wobble plate 106 does not rotate relative to the stationary gear 108.

Figure 4:
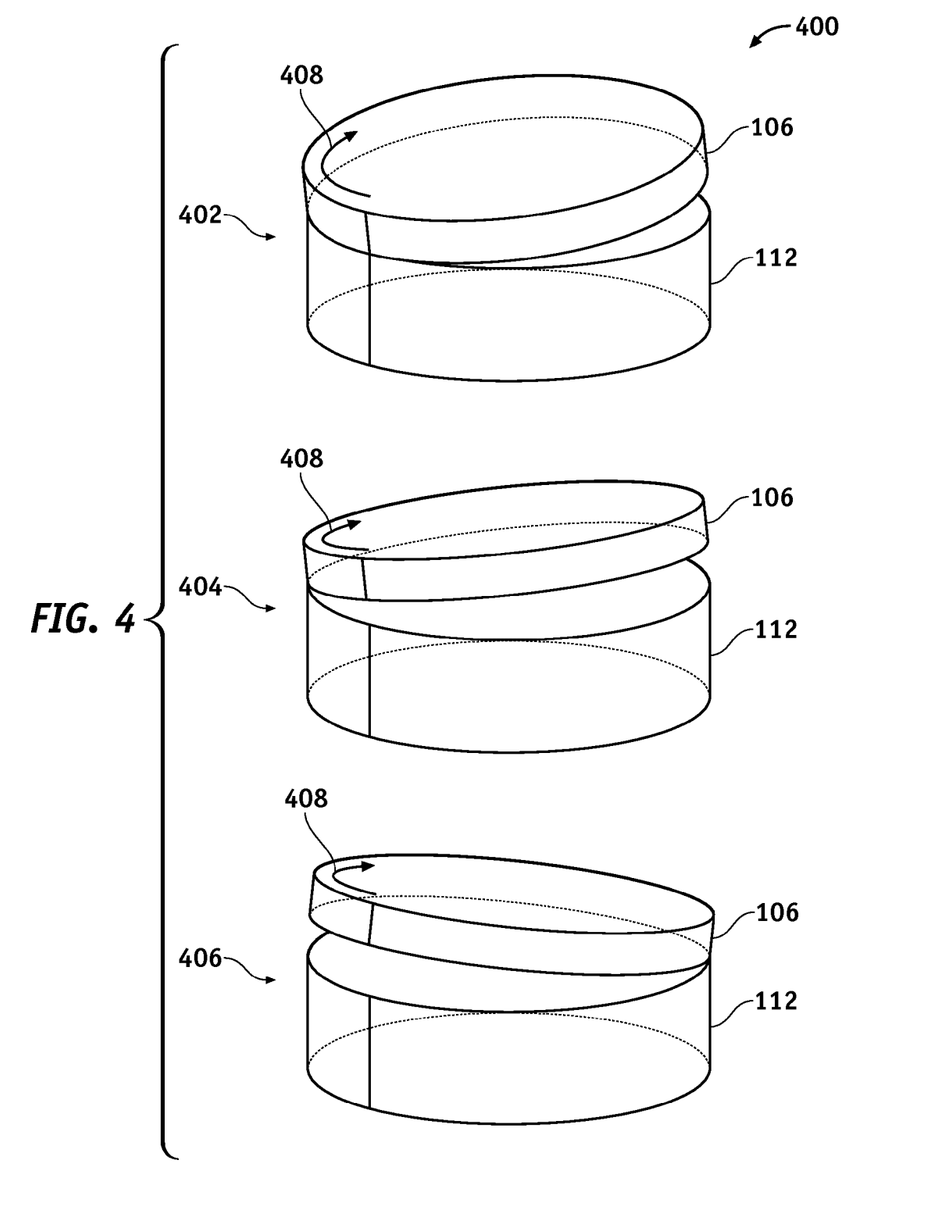
FIGS. 4 and 5 are illustrations of a clock-wise nutation of a wobble plate according to an embodiment of the disclosure.
Figure 5:
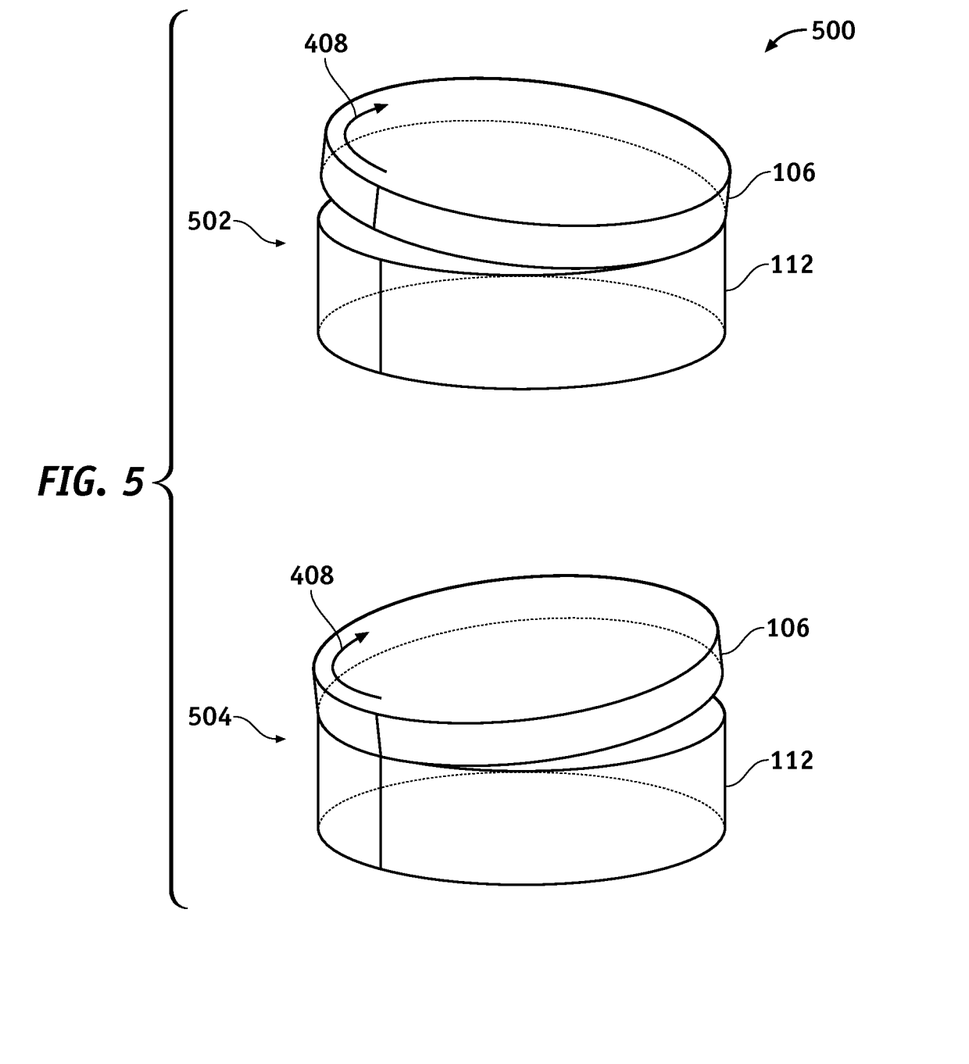

FIGS. 4 and 5 are illustrations of a clock-wise nutation of the wobble plate 106 according to an embodiment of the disclosure. Views 402, 404, 406, 502 and 504 show the wobble plate 106 nutating in a clock-wise direction 408 in response to electromagnetic force of the electromagnets 130/132/134 (FIG. 1). Torque is produced from an angular change of the wobble plate 106. When a stator pole of the stator 104 (FIG. 1) is energized, torque of the wobble plate 106 is in a direction that will reduce reluctance. In order to sustain rotation, a stator magnetic field rotates in advance of the rotor poles, thus constantly "pulling" the wobble plate 106 along.

Figure 6:
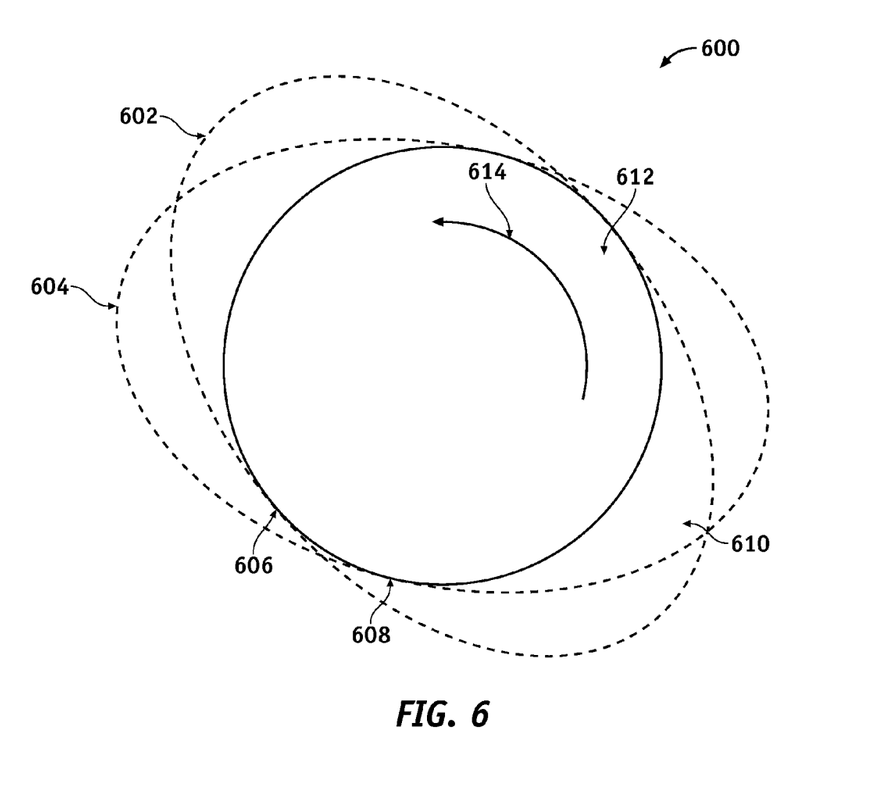
FIG. 6 is an illustration of a relationship of electromagnetic driving force to a counter clock-wise nutation of a wobble plate according to an embodiment of the disclosure.

FIG. 6 is an illustration of a relationship of electromagnetic driving force to a counter clock-wise nutation 614 of the wobble plate 106 generating a virtual ellipse motion according to an embodiment of the disclosure. A wobble plate projection 610 comprises an ellipse projection of the wobble plate 106 into an output gear plane 612. When a magnetic force is applied at a location 602 on a major axis of the wobble plate 106 (FIG. 1) at time T0, a maximum gear mesh occurs at a location 606 on a minor axis of the wobble plate 106 at time T0. When a magnetic force is applied at a location 604 on a major axis of the wobble plate 106 at time T1, a maximum gear mesh occurs at a location 608 on a minor axis of the wobble plate 106 at time T1. In this manner, a virtual ellipse motion of the virtual ellipse electric motor is generated.

Figure 7:
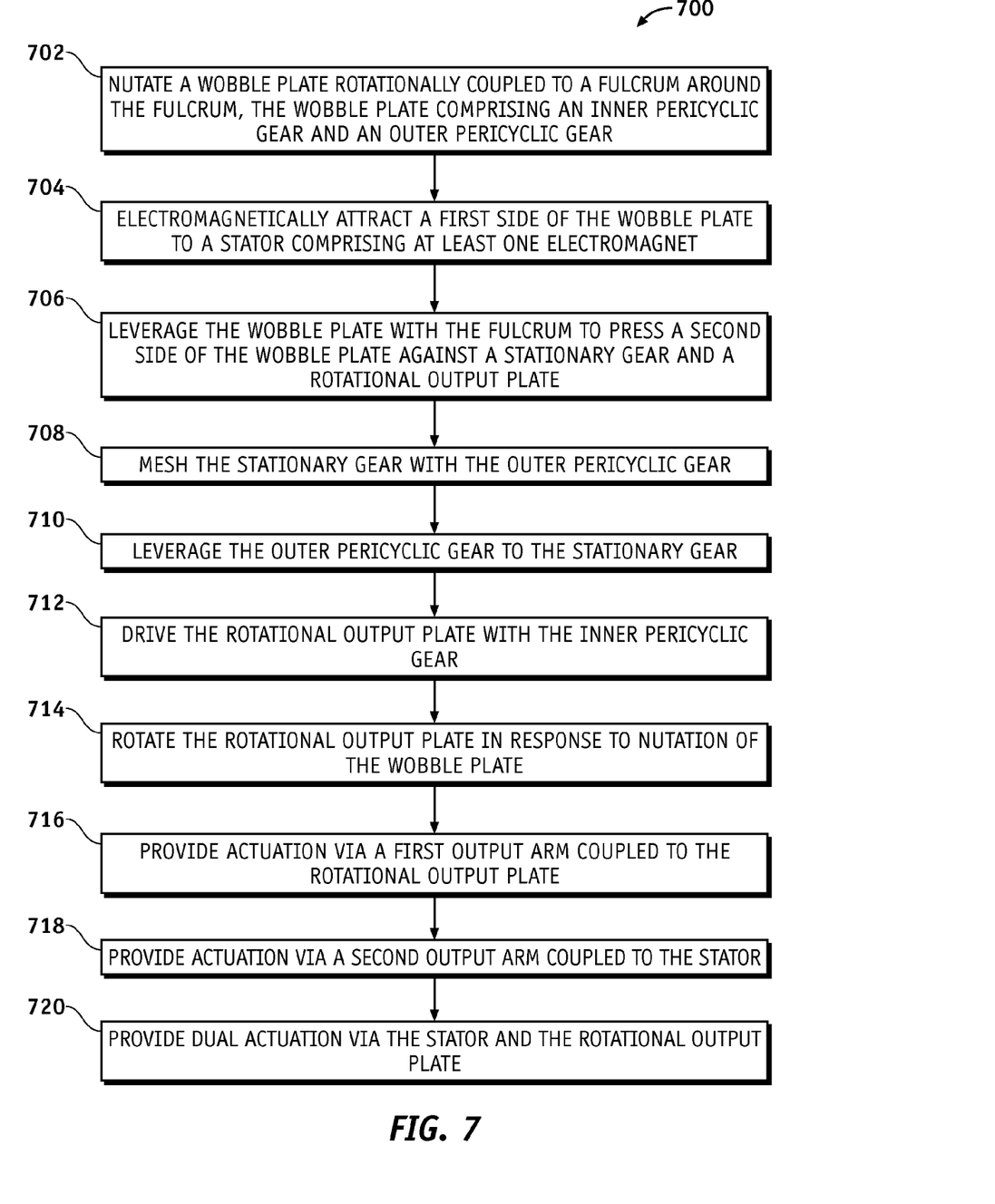
FIG. 7 is an illustration of an exemplary flowchart showing a process for operating a virtual ellipse electric motor according to an embodiment of the disclosure.

FIG. 7 is an illustration of an exemplary flowchart showing a process 700 for operating a virtual ellipse electric motor according to an embodiment of the disclosure. The various tasks performed in connection with process 700 may be performed mechanically, by software, hardware, firmware, or any combination thereof. For illustrative purposes, the following description of process 700 may refer to elements mentioned above in connection with FIGS. 1-2. In some embodiments, portions of the process 700 may be performed by different elements of the virtual ellipse electric motor 100 such as the fulcrum 126, the wobble plate 106, the stationary gear 108, the rotational output plate 120, the stator 104, etc. Process 700 may have functions, material, and structures that are similar to the embodiments shown in FIGS. 1-6. Therefore common features, functions, and elements may not be redundantly described here.

Process 700 may begin by nutating a wobble plate such as the wobble plate 106 rotationally coupled to a fulcrum such as the fulcrum 126 around the fulcrum 126, the wobble plate 106 comprising an inner pericyclic gear such as the inner pericyclic gear 122 and an outer pericyclic gear such as the outer pericyclic gear 124 (task 702).

Process 700 may continue by electromagnetically attracting a first side of the wobble plate 106 such as the first side 208 to a stator such as the stator 104 comprising at least one electromagnet 130/132/134 (task 704).

Process 700 may continue by leveraging the wobble plate 106 with the fulcrum 126 to press a second side of the wobble plate 106 such as the second side 210 against a stationary gear such as the stationary gear 108 and a rotational output plate such as the rotational output plate 120 (task 706).

Process 700 may continue by meshing the stationary gear 108 with the outer pericyclic gear 124 (task 708).

Process 700 may continue by leveraging the outer pericyclic gear 124 to the stationary gear 108 (task 710).

Process 700 may continue by driving the rotational output plate 120 with the inner pericyclic gear 122 (task 712).

Process 700 may continue by rotating the rotational output plate 120 in response to nutation of the wobble plate 106 (task 714).

Process 700 may continue by providing actuation via a first output arm such as the first output arm 116 coupled to the rotational output plate 120 (task 716).

Process 700 may continue by providing actuation via a second output arm such as the second output arm 128 coupled to the stator 104 (task 718).

Process 700 may continue by providing dual actuation via the stator 104 and the rotational output plate 120 (task 720).

Figure 8:
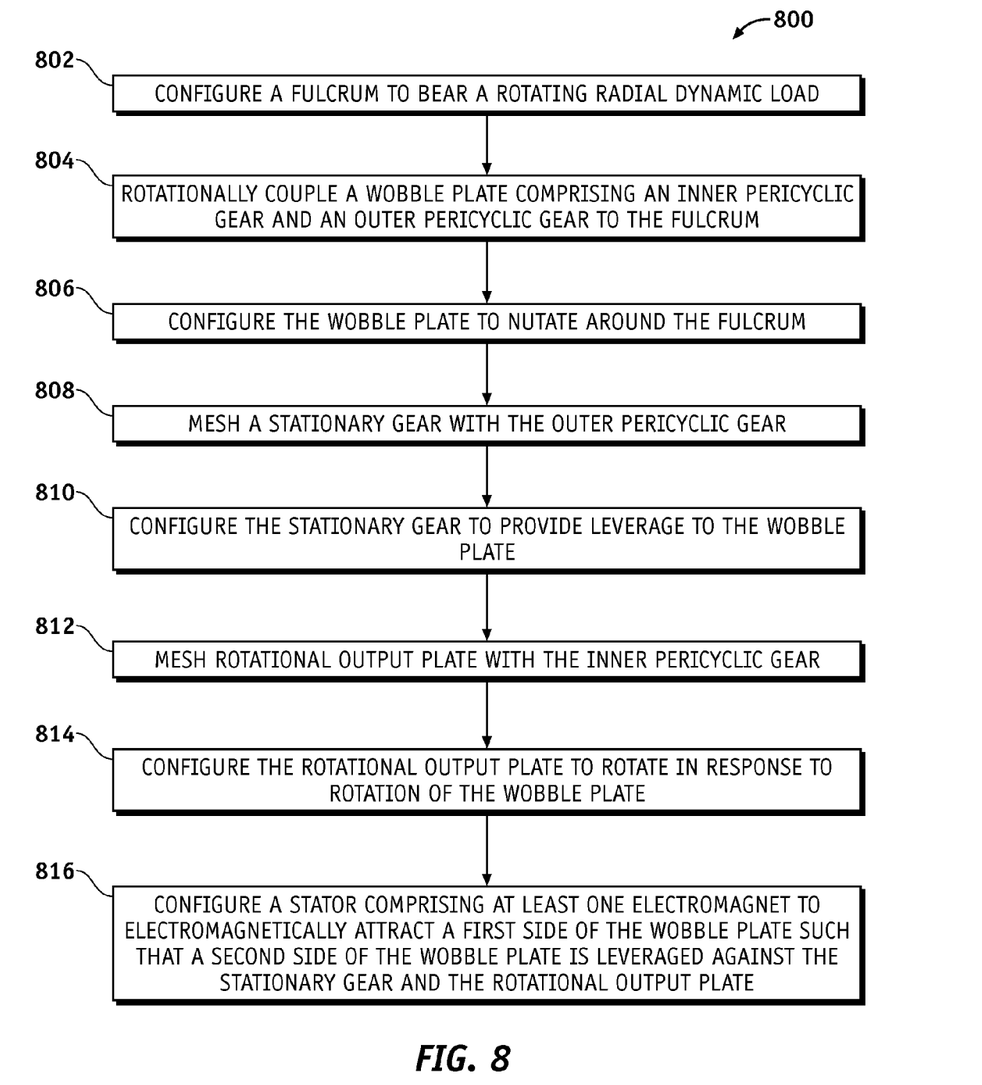
FIG. 8 is an illustration of an exemplary flowchart showing a process for configuring a virtual ellipse electric motor according to an embodiment of the disclosure.

FIG. 8 is an illustration of an exemplary flowchart showing a process 800 for configuring a virtual ellipse electric motor according to an embodiment of the disclosure. The various tasks performed in connection with process 800 may be performed mechanically, by software, hardware, firmware, or any combination thereof. For illustrative purposes, the following description of process 800 may refer to elements mentioned above in connection with FIGS. 1-2. In some embodiments, portions of the process 800 may be performed by different elements of the virtual ellipse electric motor 100 such as: the fulcrum 126, the wobble plate 106, the stationary gear 108, the rotational output plate 120, the stator 104, etc. Process 800 may have functions, material, and structures that are similar to the embodiments shown in FIGS. 1-6. Therefore common features, functions, and elements may not be redundantly described here.

Process 800 may begin by configuring a fulcrum such as the fulcrum 126 to bear a rotating radial dynamic load (task 802).

Process 800 may continue by rotationally coupling a wobble plate such as the wobble plate 106 comprising an inner pericyclic gear such as the inner pericyclic gear 122 and an outer pericyclic gear such as the outer pericyclic gear 124 to the fulcrum 126 (task 804).

Process 800 may continue by configuring the wobble plate 106 to nutate around the fulcrum 126 (task 806).

Process 800 may continue by meshing a stationary gear such as the stationary gear 108 with the outer pericyclic gear 124 (task 808).

Process 800 may continue by configuring the stationary gear 108 to provide leverage to the wobble plate 106 (task 810).

Process 800 may continue by meshing a rotational output plate such as the rotational output plate 120 with the inner pericyclic gear 122 (task 812).

Process 800 may continue by configuring the rotational output plate 120 to rotate in response to nutation of the wobble plate 106 (task 814).

Process 800 may continue by configuring a stator such as the stator 104 comprising at least one electromagnet 130/132/134 to electromagnetically attract a first side of the wobble plate 106 such as the first side 208 such that a second side of the wobble plate 106 such as the second side 210 is leveraged against the stationary gear 108 and the rotational output plate 120 (task 816).

Process 800 may continue by configuring a stator housing such as the stator housing 102 operable to house the stator 104 (task 818).

Process 800 may continue by configuring a bushing such as the bushing 110 operable to provide a bearing for the rotational output plate 120 (task 820).

Process 800 may continue by configuring a bushing retainer ring such as the bushing retainer ring 118 coupled to the bushing 110 and operable to retain the bushing 110 (task 822).

Process 800 may continue by configuring an upper housing such as the upper housing 112 coupled to a rocker arm such as the rocker arm 114 (task 824).

Process 800 may continue by configuring a ratio of wobble plate nutations to rotations of the rotational output plate 120 (task 826).

Process 800 may continue by configuring the ratio of wobble plate nutations to rotations of the rotational output plate 120 for actuation (task 828).

Process 800 may continue by configuring the ratio wherein one rotation of the rotational output plate 120 results from about 180 to about 200 nutations of the wobble plate 106 (task 830).

In this manner, embodiments of the disclosure provide a high torque low speed electro-mechanical electric motor that performance equal to or greater than hydraulic actuation with power and energy density equal to or greater than hydraulic actuation. As mentioned above, existing switched reluctance motors do not provide guaranteed starting, controlled starting direction and reversing capability with less than 6 stator poles and 4 rotor poles. Embodiments of the disclosure achieves this with 6 stator poles and one virtual rotor pole, and the switched reluctance motors described herein do not have rotor poles, but nonetheless can provide starting, holding, reversing as well as or better than existing motors. Embodiments of the disclosure provide an electric motor that need not use expensive rare earth metals, and provides low vibration, and substantially jam free and/or jam tolerant high holding load capability. The electric motor can de-couple from an output shaft when in a non-optimal condition or de-powered mechanically, and is electrically robust.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A virtual ellipse electric motor comprising:
    a fulcrum operable to bear a rotating radial dynamic load;
    a wobble plate rotationally coupled to the fulcrum and operable to nutate around the fulcrum, and comprising an inner pericyclic gear and an outer pericyclic gear;
    a stationary gear operable to mesh with the outer pericyclic gear and provide leverage to the wobble plate;
    a rotational output plate operable to mesh with the inner pericyclic gear and rotate in response to nutation of the wobble plate; and
    a stator comprising at least one electromagnet and operable to electromagnetically attract a first side of the wobble plate such that a second side of the wobble plate is leveraged against the stationary gear and the rotational output plate.

2. The virtual ellipse electric motor of claim 1, further comprising a stator housing operable to house the stator.

3. The virtual ellipse electric motor of claim 1, further comprising a bushing operable to provide bearing for the rotational output plate.

4. The virtual ellipse electric motor of claim 3, further comprising bushing retainer ring coupled to the bushing and operable to retain the bushing.

5. The virtual ellipse electric motor of claim 1, further comprising an upper housing coupled to a rocker arm.

6. The virtual ellipse electric motor of claim 1, wherein:
    a first number of gear teeth of the stationary gear is equal to a second number of gear teeth of the outer pericyclic gear; and
    a third number of gear teeth of the rotational output plate is equal to a fourth number of gear teeth of the inner pericyclic gear.

7. A method for operating a virtual ellipse electric motor, the method comprising:
    nutating a wobble plate rotationally coupled to a fulcrum around the fulcrum, the wobble plate comprising an inner pericyclic gear and an outer pericyclic gear;
    electromagnetically attracting a first side of the wobble plate to a stator comprising at least one electromagnet;
    leveraging the wobble plate with the fulcrum to press a second side of the wobble plate against a stationary gear and a rotational output plate;
    meshing the stationary gear with the outer pericyclic gear;
    leveraging the outer pericyclic gear to the stationary gear;
    driving the rotational output plate with the inner pericyclic gear; and
    rotating the rotational output plate in response to nutation of the wobble plate.

8. The method of claim 7, further comprising providing actuation via a first output arm coupled to the rotational output plate.

9. The method of claim 7, further comprising providing actuation via a second output arm coupled to the stator.

10. The method of claim 7, further comprising providing dual actuation via the stator and the rotational output plate.

11. The method of claim 7, wherein:
    a first number of gear teeth of the stationary gear is equal to a second number of gear teeth of the outer pericyclic gear; and
    a third number of gear teeth of the rotational output plate is equal to a fourth number of gear teeth of the inner pericyclic gear.

12. A method for configuring a virtual ellipse electric motor, the method comprising:

configuring a fulcrum to bear a rotating radial dynamic load;
rotationally coupling a wobble plate comprising an inner pericyclic gear and an outer pericyclic gear to the fulcrum;
configuring the wobble plate to nutate around the fulcrum;
meshing a stationary gear with the outer pericyclic gear;
configuring the stationary gear to provide leverage to the wobble plate;
meshing a rotational output plate with the inner pericyclic gear;
configuring the rotational output plate to rotate in response to nutation of the wobble plate; and
configuring a stator comprising at least one electromagnet to electromagnetically attract a first side of the wobble plate such that a second side of the wobble plate is leveraged against the stationary gear and the rotational output plate.

13. The method of claim 12, further comprising configuring a stator housing operable to house the stator.

14. The method of claim 12, further comprising configuring a bushing operable to provide a bearing for the rotational output plate.

15. The method of claim 12, further comprising configuring a bushing retainer ring coupled to the bushing and operable to retain the bushing.

16. The method of claim 12, further comprising configuring an upper housing coupled to a rocker arm.

17. The method of claim 12, further comprising configuring a ratio of wobble plate nutations to rotations of the rotational output plate.

18. The method of claim 17, further comprising configuring the ratio of wobble plate nutations to rotations of the rotational output plate for actuation.

19. The method of claim 18, further comprising configuring the ratio wherein one rotation of the rotational output plate results from about 180 to about 200 nutations of the wobbling plate.

20. The method of claim 12, wherein:
a first number of gear teeth of the stationary gear is equal to a second number of gear teeth of the outer pericyclic gear; and
a third number of gear teeth of the rotational output plate is equal to a fourth number of gear teeth of the inner pericyclic gear.

* * * * *